United States Patent
Xiang et al.

(10) Patent No.: US 10,023,401 B1
(45) Date of Patent: Jul. 17, 2018

(54) CONVEYER AND METHOD OF CONTROLLING THE SAME

(71) Applicants: BOE Technology Group Co., Ltd., Beijing (CN); Chengdu BOE Optoelectronics Technology Co., Ltd., Chengdu (CN)

(72) Inventors: Chen Xiang, Beijing (CN); Libo Chen, Beijing (CN); Zheyuan Li, Beijing (CN); Zaiqing Wang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 15/566,399

(22) PCT Filed: Apr. 28, 2017

(86) PCT No.: PCT/CN2017/082442
§ 371 (c)(1),
(2) Date: Oct. 13, 2017

(87) PCT Pub. No.: WO2017/193828
PCT Pub. Date: Nov. 16, 2017

(30) Foreign Application Priority Data

May 11, 2016 (CN) .......................... 2016 1 0311777

(51) Int. Cl.
*B65G 13/06* (2006.01)
*B65G 49/06* (2006.01)
(Continued)

(52) U.S. Cl.
CPC ....... *B65G 49/067* (2013.01); *B65G 21/2045* (2013.01); *B65G 43/10* (2013.01);
(Continued)

(58) Field of Classification Search
CPC ...... B65G 13/06; B65G 13/065; B65G 49/06; B65G 49/064; B65G 21/12; C03B 35/00
(Continued)

(56) References Cited

U.S. PATENT DOCUMENTS 2,358,447 A * 9/1944 Creamer ................. B65B 21/18
198/418.1
2,452,927 A * 11/1948 Hammen ................. B08B 9/20
294/87.28
(Continued)

FOREIGN PATENT DOCUMENTS

CN         2567182 Y     8/2003
CN         102074492 A   5/2011
(Continued)

OTHER PUBLICATIONS

First Office Action from Chinese Patent Application No. 201610311777.9, dated Nov. 23, 2017, 11 pages.
(Continued)

*Primary Examiner* — James R Bidwell
(74) *Attorney, Agent, or Firm* — Westman, Champlin & Koehler, P.A.

(57) ABSTRACT

Embodiments of the present disclosure provide a conveyer and a method of controlling the mentioned conveyer. In one embodiment, a conveyer includes: a support base; a roller assembly including a plurality of delivery rollers coaxially arranged, a plurality of lead screws and a plurality of screw motors respectively connected in a one-to-one correspondence with the plurality of lead screws, each of the delivery rollers being formed with at least one threaded hole, and being engaged with the corresponding lead screw of the lead screws through the threaded hole of the each of the delivery rollers; a driving shaft rotatably connected with the support base, the screw motors being provided on the driving shaft by fixing structures, wherein the delivery rollers are pro-
(Continued)

vided to be coaxial with the driving shaft; and a driver unit configured to drive rotation of the driving shaft.

12 Claims, 3 Drawing Sheets

(51) Int. Cl.
*B65G 21/20* (2006.01)
*B65G 43/10* (2006.01)
*B65G 47/24* (2006.01)
*B65G 47/54* (2006.01)

(52) U.S. Cl.
CPC ............ *B65G 47/24* (2013.01); *B65G 47/54* (2013.01); *B65G 2201/0214* (2013.01); *B65G 2203/0266* (2013.01)

(58) Field of Classification Search
USPC .................................. 198/782, 817; 193/35 R
See application file for complete search history.

(56) References Cited

U.S. PATENT DOCUMENTS

| | | | | |
|---|---|---|---|---|
| 4,352,447 A * | 10/1982 | Bonaddio | ............ | B26D 7/0675 |
| | | | | 198/458 |
| 8,998,208 B1 * | 4/2015 | Hong | .................... | B65G 13/06 |
| | | | | 271/314 |
| 2005/0098412 A1 * | 5/2005 | Uh | ......................... | B65G 13/12 |
| | | | | 198/817 |
| 2008/0308389 A1 * | 12/2008 | Inoue | ..................... | B65G 13/06 |
| | | | | 198/617 |
| 2010/0230237 A1 * | 9/2010 | Niewiera | ............. | B65G 49/064 |
| | | | | 198/373 |
| 2014/0138208 A1 * | 5/2014 | Guo | ..................... | B65G 49/064 |
| | | | | 198/345.1 |
| 2014/0151190 A1 * | 6/2014 | Zhu | ........................ | B65G 45/10 |
| | | | | 198/494 |

FOREIGN PATENT DOCUMENTS

| | | |
|---|---|---|
| CN | 102785936 A | 11/2012 |
| CN | 203682350 U | 7/2014 |
| CN | 203877494 U | 10/2014 |
| CN | 105947671 A | 9/2016 |
| JP | H10265018 A | 10/1998 |
| JP | 2008214000 A | 9/2008 |
| JP | 2011116523 A | 6/2011 |
| KR | 20110057680 A | 6/2011 |
| KR | 20140065581 A | 5/2014 |

OTHER PUBLICATIONS

International Search Report and Written Opinion, Notification of Transmittal of the International Search Report and the Written Opinion, and English Translation of International Search Report and Written Opinion, dated Jun. 29, 2017, 25 pages.

* cited by examiner

CONVEYER AND METHOD OF CONTROLLING THE SAME

CROSS-REFERENCE TO RELATED APPLICATION

This application is a 371 National Stage application of International Application No. PCT/CN2017/082442, filed on Apr. 28, 2017, which has not yet published, and which claims priority to Chinese Patent Application of which the patent application number is No. 201610311777.9 filed on May 11, 2016 in the State Intellectual Property Office of China, the present disclosures of which are hereby incorporated by reference in their entirety.

TECHNICAL FIELD

Embodiments of the present invention relate to the field of manufacture of liquid crystal display screen, and particularly, to a conveyer and a method of controlling the above-mentioned conveyer.

BACKGROUND

In current automatic production lines of liquid crystal display screen and the like, conveyers such as manipulator and delivery roller, especially the delivery roller, are widely used to transport products.

Figure 1:
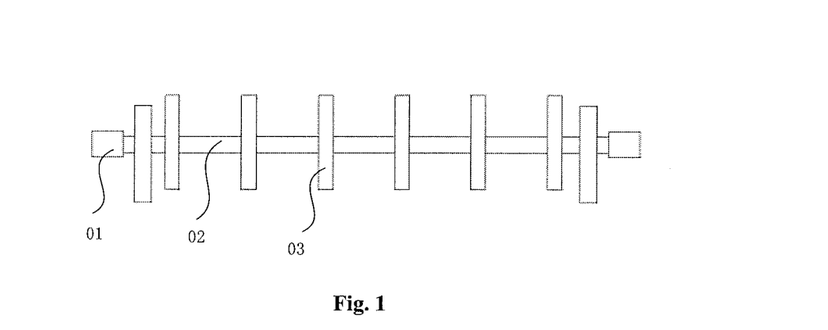
FIG. 1 is a schematic view showing a structure of a prior art conveyer.

In an existing automatic production line, referring to FIG. 1, a delivery roller wheel includes a support 01, a driving shaft 02 and a plurality of delivery rollers 03 mounted on the driving shaft 02. The plurality of delivery rollers 03 are fixedly connected to be coaxial with the driving shaft 02. When an external power is inputted to the driving shaft 02, the delivery rollers 03 are driven to rotate, so as to implement delivery of products.

However, when using the prior art solution to implement delivery of products, the delivery rollers 03 often leave some prints of the rollers on surface of some products, which in turn leads to defective products.

SUMMARY

According to one aspect of embodiments of the present invention, there is provided a conveyer, comprising: a support base; a roller assembly comprising a plurality of delivery rollers coaxially arranged, a plurality of lead screws and a plurality of screw motors respectively connected in a one-to-one correspondence with the plurality of lead screws, each of the delivery rollers being formed with at least one threaded hole and being configured to move along an axial direction by an engagement between the threaded hole of the delivery roller and a corresponding one of the lead screws; a driving shaft rotatably connected with the support base, the screw motors being provided on the driving shaft by fixing structures, wherein the delivery rollers are provided to be coaxial with the driving shaft; and a driver unit configured to drive rotation of the driving shaft, so that the driving shaft drives the screw motors to rotate simultaneously, to drive the roller assembly to rotate about an axis of the driving shaft.

In some embodiments, each of the delivery rollers is formed with through holes configured to allow the others of the lead screws to pass therethrough.

In some embodiments, guide sleeves are provided in the through holes and at positions where the delivery rollers and the driving shaft are in slide connection, and the guide sleeves are made of a smooth and wear-resistant material.

In some embodiments, the driver unit and the driving shaft are in a drive connection through a gear set including a drive gear and a driven gear engaged with each other, the drive gear and the driver unit being in a drive connection while the driven gear and the driving shaft being in a fixed connection.

In some embodiments, the roller assembly further comprises two limit rollers respectively connected fixedly with the driving shaft, and the plurality of delivery rollers are slidably fitted over the driving shaft and are located between the two limit rollers.

In some embodiments, the conveyer may further comprise a transmission unit configured to transmit a control signal and electrical energy to the screw motors, wherein the transmission unit comprises an input end and an output end being in a slide connection with each other, the input end is fixed on the support base, the output end is fixed on the driving shaft and is connected to the plurality of screw motors, respectively, and, the input end and the output end are kept in a slide contact with each other when the driving shaft rotates.

In some embodiments, the input end of the transmission unit comprises an electrical brush while the output end of the transmission unit comprises an electrically conductive piece, the electrically conductive piece is provided to be coaxial with the driving shaft and has a radial section of a circular shape, and the electrical brush is in a slide contact with a sidewall of the electrically conductive piece.

In some embodiments, the electrical brush comprises a plurality of connecting terminals and a plurality of brush heads, and a mount configured for fixations of the connecting terminals and the brush heads, the plurality of connecting terminals and the plurality of brush heads are in a one-to-one correspondence to form a plurality of transmission lines which are not in communication with one another, the mount and the support base are in a fixed connection with each other, the electrically conductive piece comprises a plurality of electrically conductive rings which are coaxially arranged and are not in communication with one another, and the plurality of electrically conductive rings and the plurality of brush heads are in a slide contact with each other in a one-to-one correspondence.

In some embodiments, the driving shaft is a hollow shaft, the output end of the transmission unit is electrically connected with the screw motors by wires passing through a shaft hole of the driving shaft.

In some embodiments, the support base is provided with a bearing which mates with the driving shaft.

In some embodiments, the conveyer may further comprise a detection unit and a comparison unit, wherein the detection unit is connected with the comparison unit through the transmission unit, the detection unit is configured to detect positions of the delivery rollers on the driving shaft, generate coordinate parameters of the delivery rollers, and transmit the coordinate parameters of the delivery rollers to the comparison unit through the transmission unit, the comparison unit is configured to compare the coordinate parameters of the delivery rollers with coordinate parameters of dummy regions of a product to be delivered, and send the control signal to the screw motors through the transmission unit.

According to one aspect of embodiments of the present invention, there is provided a method of controlling the above conveyer provided with the detection unit and the comparison unit, and the method comprises the following steps of:

collecting information parameters of the product to be delivered from a product information network, to obtain coordinate parameters of the dummy regions of the product to be delivered;

detecting, by the detection unit of the conveyer, positions of the delivery rollers on the driving shaft, generating coordinate parameters of the delivery rollers, and transmitting the coordinate parameters of the delivery rollers to the comparison unit through the transmission unit; and comparing, by the comparison unit, the coordinate parameters of the delivery rollers with the coordinate parameters of the dummy regions of the product to be delivered;

implementing delivery of the product to be delivered if the coordinate parameters of the delivery rollers are consistent with the coordinate parameters of the dummy regions of the product to be delivered, namely, if the delivery rollers of the conveyer are in ideal positions;

and, if the coordinate parameters of the delivery rollers are not consistent with the coordinate parameters of the dummy regions of the product to be delivered, namely, if the delivery rollers of the conveyer are not in ideal positions, adjusting positions of the delivery rollers having the coordinate parameters which are not consistent with the coordinate parameters of the dummy regions of the product to be delivered, transmitting the control signal and electrical energy to the screw motors through the transmission unit, to control turn-on of the screw motors corresponding to the delivery rollers having the coordinate parameters which are not consistent with the coordinate parameters of the dummy regions of the product to be delivered, so as to move the delivery rollers to the ideal positions in the axial direction.

BRIEF DESCRIPTION OF THE DRAWINGS

In order to provide a more clear explanation of embodiments of the present invention or prior art solutions, there is provided a brief introduction of the attached drawings used in the following description of the embodiments and the prior art solutions. Obviously, the drawings mentioned in the following description belong to some embodiments of the present invention. However, for those skilled in the art, other drawings can be achieved on the basis of these attached drawings without involving any inventive steps.

DETAILED DESCRIPTION OF THE EMBODIMENTS

In order to provide a more clear understanding of technique solutions of embodiments of the present invention, the embodiments of the present invention will be further described hereinafter in detail and completely with reference to the attached drawings. Obviously, the embodiments are only some of embodiments of the present invention, instead of all of the embodiments of the present invention. For those skilled in the art, other embodiments achieved by referring to the following embodiments without involving any inventive steps fall into the scope of the present invention.

It should be noted that in the description of embodiments of the present invention, orientations or positional relationships denoted by terminologies "center", "upper", "lower", "front", "rear", "left", "right", "vertical", "horizontal", "top", "bottom" "inside", "outside" and the likes are those shown in the figures, and only intended for easing and simplifying the description of embodiments of the present invention, instead of expressing or implying that the devices or elements should be located at specific orientations or should be configured and manipulated at specific orientations, accordingly, they are not intended to limit the scope of the present invention.

It should be noted that in the description of embodiments of the present invention, unless otherwise specified and defined definitely, terminologies "mount", "connect to", and "connect with" should be explained in a broad sense, for example, it can be a fixed connection, or a detachable connection, or an integrated connection; or, it also can be a mechanical connection, or an electrical connection; or else, it can be a direct connection or an indirect connection with an intermediate element; or else, it can be an internal connection between two components. For those skilled in the art, the above terminologies can be explained in specific situations in the present invention.

Figure 2:
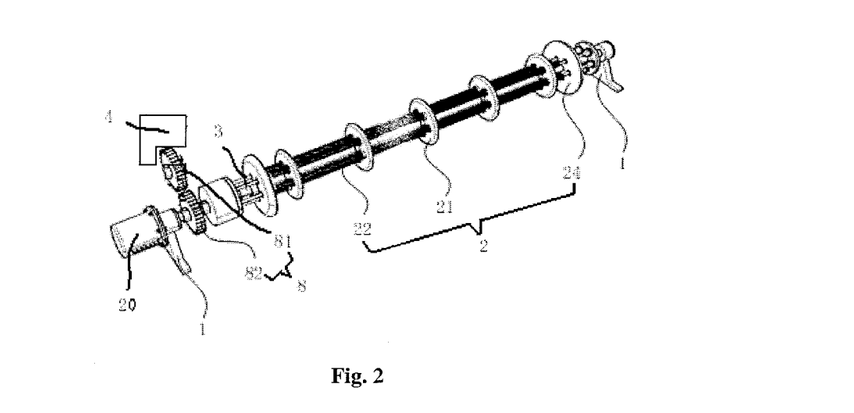
FIG. 2 is a schematic view showing a structure of a conveyer according to an embodiment of the present disclosure.
Figure 3:
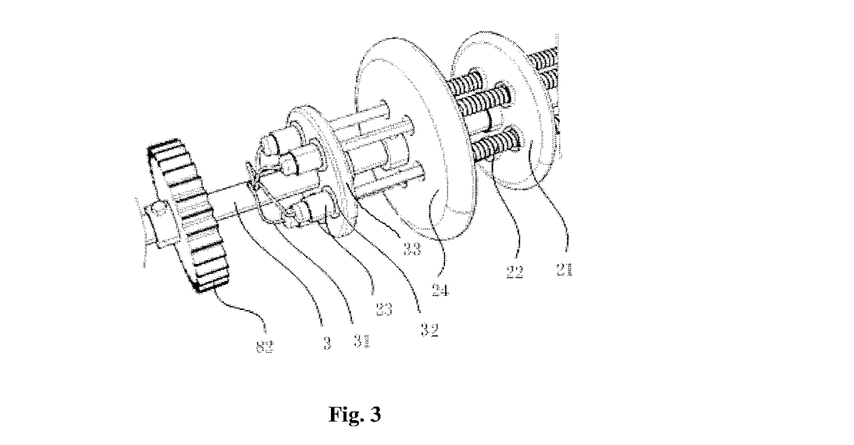
FIG. 3 is an enlarged schematic view showing a structure of connections between screw motors and lead screws in the conveyer according to the embodiment of the present disclosure.
Figure 4:
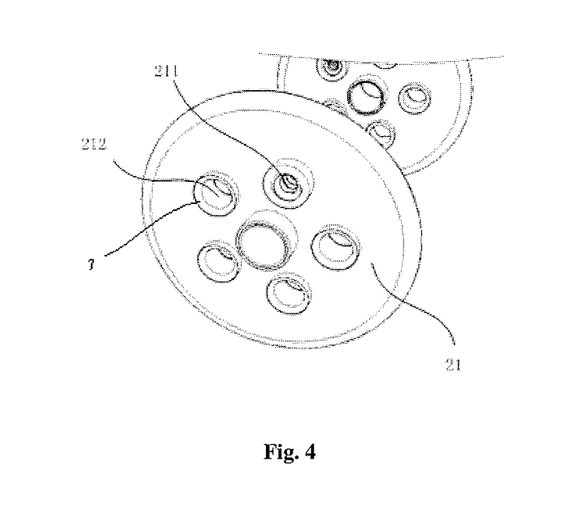
FIG. 4 is an enlarged schematic view showing a structure of a delivery roller in the conveyer according to the embodiment of the present disclosure.

A conveyer is provided according to embodiments of the present invention. Referring to FIGS. 2, 3 and 4, the conveyer comprises: a support base 1, a roller assembly 2, a driving shaft 3 and a driver unit 4. The roller assembly 2 comprises a plurality of delivery rollers 21 coaxially arranged, a plurality of lead screws 22 and a plurality of screw motors 23 connected in a one-to-one correspondence with the plurality of lead screws 22, each of the delivery rollers 21 is formed with one threaded hole 211 and is configured to move along an axial direction by an engagement between the threaded hole 211 of the each of the delivery rollers 21 and the corresponding lead screw 22 of the lead screws 22. In one embodiment, each of the delivery rollers 21 is formed with through holes 212 configured to allow the others of the lead screws 22 to pass therethrough. The driving shaft 3 is rotatably connected with the support base 1, the driving shaft 3 and the roller assembly 2 are fixedly connected, and the driving shaft 3 can drive the roller assembly 2 to rotate about an axis of the driving shaft 3. The screw motors 23 are provided on the driving shaft 3 by fixing structures 33, and the plurality of delivery rollers 21 are provided to be coaxial with the driving shaft 3. The driver unit 4 is configured to drive rotation of the driving shaft 3, so that the driving shaft 3 drives the screw motors 23 to rotate simultaneously, to drive the roller assembly 2 to rotate about the axis of the driving shaft 3.

In the conveyer according to embodiments of the present invention, referring to FIGS. 2, 3 and 4, the driver unit 4 drives rotation of the driving shaft 3, so that the driving shaft 3 drives the roller assembly 2 to rotate about the axis of the driving shaft 3, thereby achieving delivery of the products. The roller assembly 2 comprises the same number of delivery rollers 21, lead screws 22 and screw motors 23. Each screw motor 23 controls one lead screw 22, and correspondingly the one lead screw 22 is in a threaded connection with one delivery roller 21. After being electrified, one screw motor 23 controls one lead screw 22 corresponding to the one screw motor 23 to rotate, so that the delivery roller 21 being in a threaded engagement with the one lead screw 22 can move in the axial direction of the driving shaft 3. In the process of manufacturing liquid crystal products, whole production article necessarily has dummy regions (namely useless regions which will not manufactured as end products). Moreover, in production articles of different types, positions of the dummy regions are different. Accordingly, for delivery of different products, in the conveyer according to embodiments of the present invention, the delivery rollers 21 can be moved in the axial direction of the driving shaft, to allow the delivery rollers 21 to contact the dummy regions of different products. In this way, even if the delivery rollers leave some prints on the dummy regions of a product, it will not make the product to be defective. Compared to that in the prior art, it can easily adjust positions of the delivery rollers according to positions of dummy regions of different products, to contact the delivery rollers with the dummy regions of the product, thereby eliminating leaving of prints of the rollers on the product during delivery of the product so as to prevent the product from becoming defective.

Specifically, referring to FIG. 2 and FIG. 3, the roller assembly 2 further comprises two limit rollers 24 respectively connected fixedly with the driving shaft 3, and the plurality of delivery rollers 21 are slidably fitted over the driving shaft 3 and are located between the two limit rollers 24. Provision of the limit roller 24 at both sides of the plurality of delivery rollers 21 can prevent the product from deviating or sliding out from the conveyer during delivery. Since the limit rollers 24 are not in contact with the product, they will not leave prints on a bottom of the product. Moreover, the limit rollers 24 are fixedly connected to the driving shaft 3 as they are provided to perform positional limitations on the delivered product. Since the delivery rollers 21 are required to move in the axial direction of the driving shaft 3, the delivery rollers 21 are slidably fitted over the driving shaft 3.

Figure 5:
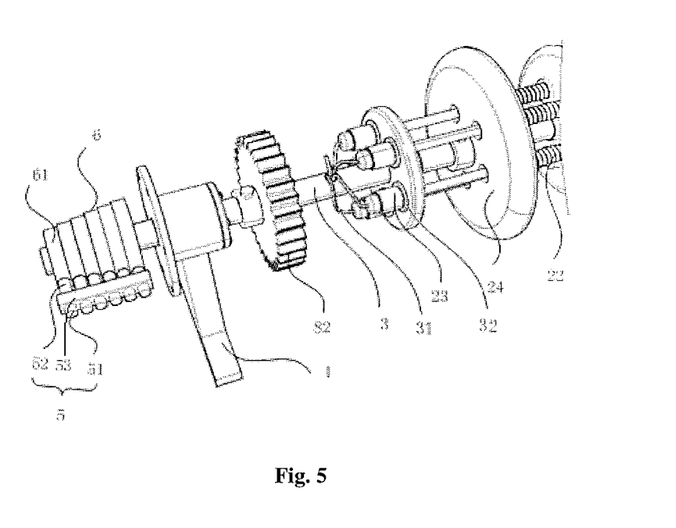
FIG. 5 is an enlarged schematic view showing a structure of a transmission unit in the conveyer according to the embodiment of the present disclosure.

Referring to FIG. 5, as the screw motors 23 are provided in the roller assembly 2 and the roller assembly 2 and the driving shaft 3 are in a fixed connection, when the driving shaft 3 rotates, the screw motors 23 rotate with rotation of the driving shaft. Here, transmission of control signal and electrical energy of the screw motors will not be connected directly by wires, accordingly, the conveyer according to embodiments of the present invention further comprises a transmission unit 20 (see FIG. 7) configured to transmit control signal and electrical energy to the screw motors 23. In structure, the transmission unit comprises an input end (for example, an electrical brush 5 shown in FIG. 5 and which will be described in detail hereinafter) and an output end (for example, an electrically conductive piece 6 shown in FIG. 5 and which will be described in detail hereinafter) being in a slide connection, the input end is fixed on the support base 1, the output end is fixed on the driving shaft 3 and is connected to the plurality of screw motors 23, respectively, and, the input end and the output end are kept in a slide contact with each other when the driving shaft 3 rotates. It should be noted that, the "slide contact" mentioned herein means that two components which are in contact with each other have their contact surfaces which are able to slide relative to each other. In the conveyer according to embodiments of the present invention, transmission of control signal and electrical energy to the screw motors 23 can be ensured by providing the transmission unit that is configured to transmit control signal and electrical energy to the screw motors 23, specifically, by keeping the input end and the output end of the transmission unit in a slide contact with each other when the driving shaft 3 rotates. Of course, in other embodiments, electrical energy for the screw motors can be supplied by batteries and control signal can be transmitted in a wireless communication manner, although use of the batteries makes against environment protection while wireless communication is vulnerable to be disturbed by ambient environment and thus owns poor transmission reliability. As a result, it is optimal to adopt the slide connection between the input end and the output.

In the conveyer according to embodiments of the present invention, to eliminate leaving of prints of the rollers on product during delivery of the product so as to prevent the product from becoming defective, is achieved by adjusting positions of the delivery rollers 21 to correspond to positions of the dummy regions of the product to be delivered. If the comparison and observation and then the adjustment are done manually, it will be low in efficiency and in accuracy and thus is not suitable to be applied in large-scale production lines. Accordingly, in order to make the adjustment of positions of the delivery rollers 21 to be high in efficiency and in accuracy, referring to FIG. 7, the conveyer according to embodiments of the present invention further comprises a detection unit 10 and a comparison unit 30, the detection unit 10 is connected with the comparison unit 30 through the transmission unit 20, the detection unit 10 is configured to detect positions of the delivery rollers 21 on the driving shaft 3, generate coordinate parameters of the delivery rollers 21, and transmit the coordinate parameters to the comparison unit 30 through the transmission unit 20, the comparison unit 30 is configured to compare the coordinate parameters of the delivery rollers 21 with coordinate parameters of dummy regions of a product to be delivered, and send the control signal to the screw motors 23 through the transmission unit 20. In this way, coordinate parameters of positions of the delivery rollers 21 on the driving shaft 3 can be achieved easily. After the coordinate parameters of the delivery roller 21 are sent to the comparison unit 30, the comparison unit 30 can compare coordinate parameters of the delivery rollers 21 with the coordinate parameters of dummy regions of the product to be delivered, so as to decide whether or not to deliver the product. Specifically, when the coordinate parameters of the delivery rollers 21 are consistent with the coordinate parameters of dummy regions of the product to be delivered, it is considered that the delivery rollers 21 are in ideal positions, so that delivery of the product to be delivered can be implemented. When the coordinate parameters of the delivery rollers 21 are not consistent with the coordinate parameters of dummy regions of the product to be delivered, screw motors 23 corresponding to some delivery rollers 21 having inconsistent coordinate parameters are determined, and then control signals are transmitted through the transmission unit 20 to the corresponding screw motors 23, to turn on the corresponding screw motors 23, so as to move the delivery rollers 21 to ideal positions in the axial direction of the driving shaft 3. After that, delivery of the product to be delivered is implemented. Compared to manual operation, it can improve in working efficiency and in accuracy of the adjustment. It should be noted that, in the conveyer according to embodiments of the present invention, the detection unit 10, the transmission unit 20 and the comparison unit 30 may be but are not limited to common functional modules in the art. In addition, the detection unit 10 and the comparison unit 30 may be provided on the support base 1 or the driving shaft 3 of the conveyer.

In order to achieve transmission of control signal and electrical energy in the process of a mechanical rotation, in one embodiment, referring to FIG. 5, the input end of the transmission unit comprises an electrical brush 5 while the output end of the transmission unit comprises an electrically conductive piece 6, the electrically conductive piece 6 is provided to be coaxial with the driving shaft 3 and the electrically conductive piece 6 has a radial section of a circular shape, and the electrical brush 5 is in a slide contact with a sidewall of the electrically conductive piece 6. In this way, when the screw motors 23 rotate with rotation of the driving shaft 3, the sidewall of the electrically conductive piece 6 always keeps in a slide contact with the electrical brush 5, which can achieve transmission of control signal and electrical energy in the process of rotation.

A plurality of screw motors 23 is provided in the roller assembly 2, and the plurality of screw motors 23 are used to control the plurality of delivery rollers 21 in a one-to-one correspondence, and a corresponding number of transmission lines are included for control signals and electrical energies. Accordingly, in order to transmit a plurality of control signals and electrical energies, referring to FIG. 5, the electrical brush 5 comprises a plurality of connecting terminals 51 and a plurality of brush heads 52, and a mount 53 configured for fixations of the connecting terminals 51 and the brush heads 52, the plurality of connecting terminals 51 and the plurality of brush heads 52 are in a one-to-one correspondence to form a plurality of transmission lines which are not in communication with one another, the mount 53 and the support base 1 are in a fixed connection with each other, the electrically conductive piece 6 comprises a plurality of electrically conductive rings 61 which are not in communication with one another, and the plurality of electrically conductive rings 61 and the plurality of brush heads 52 are in a slide contact in a one-to-one correspondence. The plurality of connecting terminals 51 and the plurality of brush heads 52 are in a one-to-one correspondence while the plurality of electrically conductive rings 61 and the plurality of brush heads 52 are in a slide contact in a one-to-one correspondence, which form a plurality of transmission lines which are not in communication with one another, to achieve a plurality of transmissions for control signals and electrical energies in which each transmission line is provided to control one screw motor.

In the transmission unit, wires are often used for transmission, the output end of the transmission unit is connected to the screw motors 23, and the wires will rotate with rotation of the driving shaft 3, in this case, the wires are possible to be damaged when they are intertwined with external objects. Accordingly, referring to FIG. 3 and FIG. 5, the driving shaft 3 may be provided to be a hollow shaft, the output end of the transmission unit is electrically connected with the screw motors 23 by wires 31 passing through a shaft hole of the driving shaft 3. After passing the wires 31 through the shaft hole of the driving shaft 3, rotation of the wires 31 within the shaft hole will not encounter the problem that the wires are damaged due to being intertwined with external objects, moreover, the driving shaft 3 plays a protection role on the wires.

In the process of moving the delivery rollers 21 in the axial direction of the driving shaft 3, friction will occurs between the through holes 212 and the lead screws which controls the others of the delivery rollers 21, meanwhile, friction will occurs at positions where the delivery rollers and the driving shaft 3 are in slide connection, which goes against movement of the delivery roller 21 in the axial direction of the driving shaft 3. In order to reduce friction force occurred in the process of moving the delivery rollers 21 in the axial direction of the driving shaft 3, referring to FIG. 4, guide sleeves 7 are provided in the through holes 212 and at positions where the delivery rollers 21 and the driving shaft 3 are in slide connection, and the guide sleeves 7 are made of smooth and wear-resistant material, which can be selected at will, for example, copper sleeves. In addition, the guide sleeves 7 can be replaced easily when worn. This ensures friction force occurred in the movement of the delivery rollers 21 in the axial direction of the driving shaft 3 is always small.

The driver unit 4 may be an electrical motor which is in a drive connection with the driving shaft 3, to drive rotation of the driving shaft 3. Gear drive or belt drive may be adopted as manner of the drive connection. Referring to FIG. 3 and FIG. 5, the driver unit 4 and the driving shaft 3 are in a drive connection through a gear set 8, and the gear set 8 includes a drive gear 81 and a driven gear 82 engaged to each other, the drive gear 81 and the driver unit 4 are in a drive connection while the driven gear 82 and the driving shaft 3 are in a fixed connection. Adoption of the gear drive achieves good accuracy in transmission ratio, high efficiency, compact structure and reliable operation.

Since the driving shaft 3 is rotatably connected with the support base 1, the support base 1 may be provided with a bearing 32 which mates with the driving shaft 3. Referring to FIG. 3 and FIG. 5, adoption of the bearing achieves rotatable connection and supporting of the driving shaft 3, and reduce friction force occurred in the process of rotation of the driving shaft 3.

Figure 6:
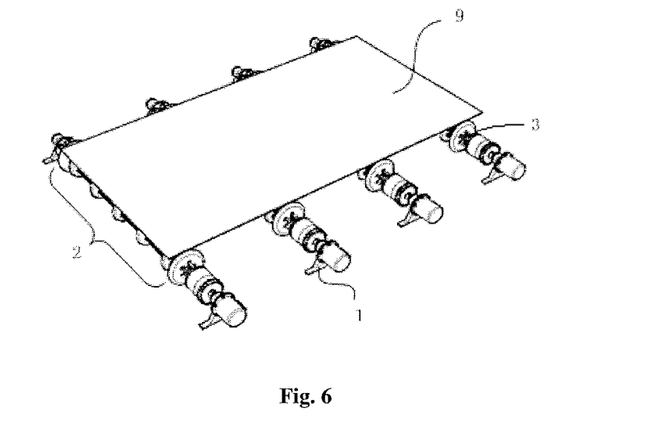
FIG. 6 is an enlarged schematic view showing a structure of a plurality of roller assemblys disposed side by side in the conveyer according to the embodiment of the present disclosure.

It should be noted that, in practical production operations, referring to FIG. 6, in order to implement a long-distance delivery of the product 9, the conveyer according to embodiments of the present invention generally include a plurality of roller assemblys 2 provided side by side, a plurality of driving shaft 3 respectively fixedly connected with the plurality of roller assemblys 2, and a plurality of support bases 1 equipped with bearings and provided in corresponding positions at both ends of the plurality of driving shaft 3. The driver unit can drive the plurality of driving shafts 3 to rotate, so as to drive the plurality of roller assemblys 2 to rotate, thereby achieving the long-distance delivery of the product 9.

Figure 7:
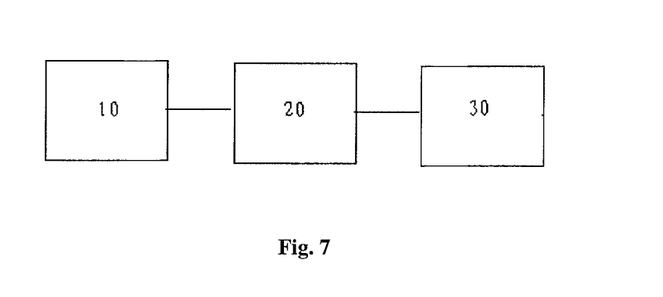
FIG. 7 is a functional block diagram showing some units in the conveyer according to the embodiment of the present disclosure.

A method of controlling the abovementioned conveyer provided with the detection unit 10 and the comparison unit 30 is also provided according to embodiments of the present invention. The method comprises the following steps of:

collecting information parameter of the product to be delivered from product information network, to obtain coordinate parameters of the dummy regions of the product to be delivered;

detecting, by the detection unit 10 of the conveyer, positions of the delivery rollers 21 on the driving shaft 3, generating coordinate parameters of the delivery rollers 21, and transmitting the coordinate parameters to the comparison unit 30;

comparing, by the comparison unit 30, the coordinate parameters of the delivery rollers 21 with the coordinate parameters of dummy regions of the product to be delivered; and, implementing delivery of the product to be delivered if the coordinate parameters of the delivery rollers 21 are consistent with the coordinate parameters of dummy regions of the product to be delivered, namely, if the delivery rollers 21 of the conveyer are in ideal positions; and, if the coordinate parameters of the delivery rollers 21 are not consistent with the coordinate parameters of dummy regions of the product to be delivered, namely, if the delivery rollers 21 of the conveyer are not in ideal positions, adjusting positions of the delivery rollers 21 having the coordinate parameters which are not consistent with the coordinate parameters of dummy regions of the product to be delivered, transmitting the control signal and electrical energy to the screw motors 23 through the transmission unit 20, to control turn-on of the screw motors 23 corresponding to the delivery rollers 21 having the coordinate parameters which are not consistent with the coordinate parameters of dummy regions of the product to be delivered, so as to move the delivery rollers 21 to the ideal positions in the axial direction.

With the controlling method according to the embodiments of the present invention, before the product is delivered, coordinate parameters of the dummy regions of the product to be delivered is obtained from product information network. The detection unit 10 can detect and generate coordinate parameters of the delivery rollers 21, and transmit the coordinate parameters to the comparison unit. The comparison unit 30 compares the coordinate parameters of the delivery rollers 21 with the coordinate parameters of dummy regions of the product to be delivered, and performs the following control. Delivery of the product is implemented if the coordinate parameters of the delivery rollers 21 are consistent with the coordinate parameters of dummy regions of the product to be delivered, namely, if the delivery rollers 21 are to be in contact with the dummy regions of the product when delivering the product. If the coordinate parameters of the delivery rollers 21 are not consistent with the coordinate parameters of dummy regions of the product to be delivered, positions of the delivery rollers 21 need to be adjusted. Specifically, signals are transmitted to the screw motors 23 for controlling the delivery roller 21 having the coordinate parameters which are not consistent with the coordinate parameters of dummy regions of the product, to turn on the screw motors 23, so as to adjust positions of the delivery rollers 21 such that the coordinate parameters of the delivery rollers 21 are consistent with the coordinate parameters of dummy regions of the product. After that, delivery of the product is implemented. In this way, it is ensured that the delivery rollers 21 will contact dummy regions of any product during delivery of the product, which can eliminate leaving of prints of the rollers on a product during delivery of the product so as to prevent the product from becoming defective.

The above are merely specific embodiments of the present invention, but the scope of the present invention is not limited to this. It will be apparent for those skilled in the art that some changes and modifications on these embodiments may be made without departing from the principles and spirit of the present invention, the scope of which is defined in the claims.

What is claimed is:

1. A conveyer, comprising:
   a support base;
   a roller assembly comprising a plurality of delivery rollers coaxially arranged, a plurality of lead screws and a plurality of screw motors respectively connected in a one-to-one correspondence with the plurality of lead screws, each of the delivery rollers being formed with at least one threaded hole and being configured to move along an axial direction by an engagement between the threaded hole of the delivery roller and a corresponding one of the lead screws;
   a driving shaft rotatably connected with the support base, the screw motors being provided on the driving shaft by fixing structures, wherein the delivery rollers are provided to be coaxial with the driving shaft; and
   a driver unit configured to drive rotation of the driving shaft, so that the driving shaft drives the screw motors to rotate simultaneously, to drive the roller assembly to rotate about an axis of the driving shaft.

2. The conveyer of claim 1, wherein, each of the delivery rollers is formed with through holes configured to allow the others of the lead screws to pass therethrough.

3. The conveyer of claim 2, wherein, guide sleeves are provided in the through holes and at positions where the delivery rollers and the driving shaft are in slide connection, and the guide sleeves are made of a smooth and wear-resistant material.

4. The conveyer of claim 1, wherein, the driver unit and the driving shaft are in a drive connection through a gear set including a drive gear and a driven gear engaged with each other, the drive gear and the driver unit being in a drive connection while the driven gear and the driving shaft being in a fixed connection.

5. The conveyer of claim 1, wherein, the roller assembly further comprises two limit rollers respectively connected fixedly with the driving shaft, and the plurality of delivery rollers are slidably fitted over the driving shaft and are located between the two limit rollers.

6. The conveyer of claim 1, further comprising a transmission unit configured to transmit a control signal and electrical energy to the screw motors, wherein the transmission unit comprises an input end and an output end being in a slide connection with each other, the input end is fixed on the support base, the output end is fixed on the driving shaft and is connected to the plurality of screw motors, respectively, and, the input end and the output end are kept in a slide contact with each other when the driving shaft rotates.

7. The conveyer of claim 6, wherein, the input end of the transmission unit comprises an electrical brush while the output end of the transmission unit comprises an electrically conductive piece, the electrically conductive piece is provided to be coaxial with the driving shaft and has a radial section of a circular shape, and the electrical brush is in a slide contact with a sidewall of the electrically conductive piece.

8. The conveyer of claim 7, wherein, the electrical brush comprises a plurality of connecting terminals and a plurality of brush heads, and a mount configured for fixations of the connecting terminals and the brush heads, the plurality of connecting terminals and the plurality of brush heads are in a one-to-one correspondence to form a plurality of transmission lines which are not in communication with one another, the mount and the support base are in a fixed connection with each other, the electrically conductive piece comprises a plurality of electrically conductive rings which are coaxially arranged and are not in communication with one another, and the plurality of electrically conductive rings and the plurality of brush heads are in a slide contact with each other in a one-to-one correspondence.

9. The conveyer of claim 6, wherein, the driving shaft is a hollow shaft, the output end of the transmission unit is electrically connected with the screw motors by wires passing through a shaft hole of the driving shaft.

10. The conveyer of claim 1, wherein, the support base is provided with a bearing which mates with the driving shaft.

11. The conveyer of claim 6, further comprising a detection unit and a comparison unit, wherein the detection unit is connected with the comparison unit through the transmission unit, the detection unit is configured to detect positions of the delivery rollers on the driving shaft, generate coordinate parameters of the delivery rollers, and transmit the coordinate parameters of the delivery rollers to the comparison unit through the transmission unit, the comparison unit is configured to compare the coordinate parameters of the delivery rollers with coordinate parameters of dummy regions of a product to be delivered, and send the control signal to the screw motors through the transmission unit.

12. A method of controlling the conveyer of claim 11, the method comprising the following steps of:
- collecting information parameters of the product to be delivered from a product information network, to obtain coordinate parameters of the dummy regions of the product to be delivered;
- detecting, by the detection unit of the conveyer, positions of the delivery rollers on the driving shaft, generating coordinate parameters of the delivery rollers, and transmitting the coordinate parameters of the delivery rollers to the comparison unit through the transmission unit; and
- comparing, by the comparison unit, the coordinate parameters of the delivery rollers with the coordinate parameters of the dummy regions of the product to be delivered;
- implementing delivery of the product to be delivered if the coordinate parameters of the delivery rollers are consistent with the coordinate parameters of the dummy regions of the product to be delivered, namely, if the delivery rollers of the conveyer are in ideal positions;
- and, if the coordinate parameters of the delivery rollers are not consistent with the coordinate parameters of the dummy regions of the product to be delivered, namely, if the delivery rollers of the conveyer are not in ideal positions, adjusting positions of the delivery rollers having the coordinate parameters which are not consistent with the coordinate parameters of the dummy regions of the product to be delivered, transmitting the control signal and electrical energy to the screw motors through the transmission unit, to control turn-on of the screw motors corresponding to the delivery rollers having the coordinate parameters which are not consistent with the coordinate parameters of the dummy regions of the product to be delivered, so as to move the delivery rollers to the ideal positions in the axial direction.

* * * * *